United States Patent [19]

Nomura et al.

[11] 3,956,757

[45] May 11, 1976

[54] CAMERA EXPOSURE CONTROL CIRCUIT

[75] Inventors: Katsuhiko Nomura; Hiroshi Kurei, both of Kawagoe; Fumio Urano, Omiya, all of Japan

[73] Assignee: Asahi Kogaku Kogyo Kabushiki Kaisha, Japan

[22] Filed: Dec. 18, 1973

[21] Appl. No.: 425,808

[30] Foreign Application Priority Data

Dec. 30, 1972 Japan.............................. 48-458[U]

[52] U.S. Cl................................. 354/51; 354/24; 354/50; 354/60 R
[51] Int. Cl.².......................................... G03B 7/08
[58] Field of Search ..................... 354/24, 51, 60, 50

[56] References Cited
UNITED STATES PATENTS

| 3,690,230 | 9/1972 | Mori et al............................ | 354/24 |
| 3,831,180 | 8/1974 | Tsujimoto............................ | 354/51 |

Primary Examiner—L. T. Hix
Assistant Examiner—Russell E. Adams, Jr.
Attorney, Agent, or Firm—Steinberg & Blake

[57] ABSTRACT

An automatic exposure control circuit for a camera including a light receiving element positioned internally of the camera for receiving light passing through the camera objective. The light receiving element converts the incident light into a corresponding electrical quantity. A diaphragm information device is available for producing an electrical quantity corresponding to the diaphragm setting. An operational amplifier combines the aforementioned two electrical quantities and provides a combined electrical output signal which is utilized in the determination of exposure time. A capacitor, interconnected with the operational amplifier by a switch, stores the combined electrical output signal. The switch can be automatically controlled in synchronism with the photographing operation of the camera, or can be manually controlled by the operator by operation of an arrangement external to the camera.

8 Claims, 1 Drawing Figure

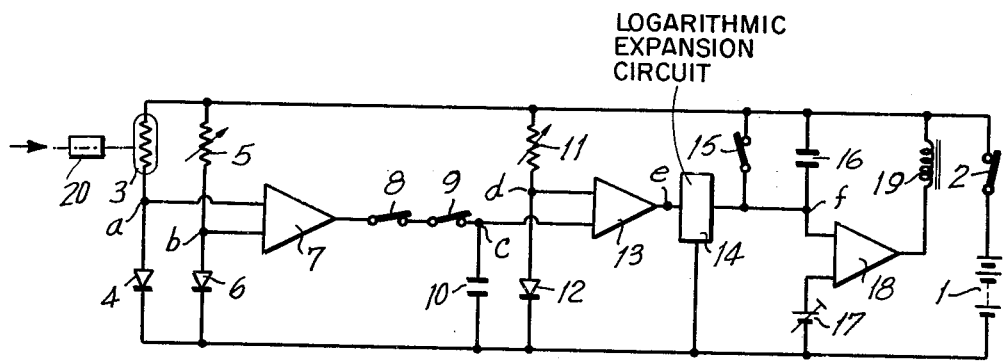

CAMERA EXPOSURE CONTROL CIRCUIT

BACKGROUND OF THE INVENTION

The present invention relates to cameras.

In particular, the present invention relates to an automatic exposure control circuit for a camera of the single lens reflex type.

As is well known, in single lens reflex cameras which include an internal light receiving element, it is necessary to memorize the light intensity prior to implementing the actual photographic operation. The internal light receiving element converts the light intensity into an electrical quantity which is generally stored by means of a capacitor upon actuation of a switch. In the course of the photographic operation, the switch is arranged to be operated automatically in synchronism with the stopping down of the diaphragm and/or with the upward swing of the mirror prior to the exposure of the film.

When the object to be photographed is located in an environment having special photographic conditions such as under a spot light or with a contrasting back light, it is often required to correct the exposure. Also, the operator may want to intentionally change the exposure for various other reasons. In order to achieve the exposure correction, some electric shutter cameras provide a memory switch which can not only be automatically actuated during the course of the sequence of photographic operations, but can also be manually operated as desired. Utilizing this type of memory switch, if an object to be photographed is located in an environment having a contrasting light environment, the photographer can first direct the camera to the shadow area and operate the memory switch manually to achieve an exposure correction when he directs the camera subsequently to the desired area to be photographed.

However, it is difficult to obtain proper exposure correction only by use of a memory operation as set forth above. As a result, it is difficult to achieve an accurate exposure correction.

SUMMARY OF THE INVENTION

It is accordingly a primary object of the present invention to provide an automatic exposure control circuit which will avoid the aforementioned drawbacks.

In particular, it is an object of the present invention to provide an automatic exposure control circuit which includes a memorizing device which operates both automatically as well as manually, to store a value dependent upon both the brightness of the object to be photographed and the diaphragm value of the camera.

Also, it is an object of the present invention to provide an automatic exposure control circuit which permits exposure control by modifying the diaphragm opening in accordance with actual conditions of the object to be photographed.

A further object of the invention is to provide an automatic exposure control circuit for use in single lens reflex cameras, where the memorized value prior to actual photographing includes information about the field brightness as well as the controlled diaphragm value, and which permits exposure correction both by modifying the diaphragm value and also by changing the film sensitivity factor.

According to the invention, a camera exposure control circuit is provided which includes a light receiving means positioned internally of the camera for receiving light passing through the objective. The light receiving means converts the light into a corresponding electrical quantity. A diaphragm information means is available for producing an electrical quantity in accordance with the diaphragm aperture. An operational amplifier combines the aforementioned two electrical quantities and provides a combined electrical output signal which is utilized to determine the exposure time. A capacitor for storing the combined electrical output signal is interconnected to the operational amplifier by means of a switch means. The switch means is under both automatic control, operating in synchronism with the sequence of photographic operations of the camera, as well as under manual control for operation by the operator by means of an arrangement external to the camera.

BRIEF DESCRIPTION OF DRAWING

The invention is illustrated by way of example in the accompanying drawing which forms part of this application and which is a wiring diagram of one possible system according to the invention.

DETAILED DESCRIPTION OF PREFERRED EMBODIMENT

Referring to the drawing, a light information circuit is provided comprising a photosensitive light-receiving means 3, such as a photoconductor, in series with a logarithmic compression element 4 such as a diode. Light-receiving means 3 is situated internally of the camera to receive light which has passed through the objective 20. There is also provided a diaphragm value information circuit comprising a diaphragm information means formed by a variable resistor 5, the latter being in series with a logarithmic compression element 6. The resistance of the variable resistor 5 is adjustable in correspondence with the aperture size. Both logarithmic compression elements 4 and 6 have substantially equal characteristics, and the variable ratio $\gamma$ of the variable resistor during adjustment thereof is equal to the $\gamma$ value of the light sensitive element 3. Both the light information circuit and the diaphragm information circuit are connected in parallel across a power source 1 which is actuated by means of the switch 2. The switch 2 is closed in a known way upon partial depression of the shutter plunger, so that the switch 2 forms a manually operable means for energizing the automatic exposure control circuit which is illustrated. The light senstivie element 3 located internally of the camera receives light representative of the brightness of the object to be photographed.

The output $a$ from the light information circuit and the output $b$ from the diaphragm information circuit are fed to an operational amplifier 7, which combines the two signals providing a combined electrical output quantity $c$ which can be stored in the memory capacitor 10. Interconnected between the operational amplifier 7 and the memory capacitor 10 is a switch means including an automatic memory switch 9 which operates automatically in a known way in synchronism with the sequence of camera operations during the course of photographing, and a manual memory switch 8 which can be manually operated by the photographer from the exterior of the camera at such times as is desired. While two separate switches 8 and 9 are shown, it is understood that they may be replaced by a single switch which can be operated both automatically and manually.

Connected in parallel with the aforementioned two information circuits is a film sensitivity information circuit comprising a variable resistor 11, forming a film sensitivity information means, and a logarithmic compression element 12. The resistance value of the variable resistor 11 is adjusted in accordance with the sensitivity value of the film being used. The characteristics of the logarithmic compression element 12 are equal to those of the logarithmic compression elements 4 and 6, and the variable ratio $\gamma$ of the variable resistor 11 is equal to those of the variable resistor 5 and the light sensitivity element 3. The output $d$ from the film sensitivity information circuit serves as one input to an operational amplifier 13 whose second input is connected to the memory capacitor 10. The output $e$ from the operational amplifier 13 is a combination of the information contained in memory capacitor 10, i.e., the diaphragm value and the brightness value, combined with the information of the film sensitivity.

The output $e$ from the operational amplifier 13 therefore represents the overall information on the photographic conditions and is applied to an electric shutter control mechanism through a logarithmic expansion circuit 14. The electric shutter control mechanism is shown, by way of example, to include a timing capacitor 16, with a timing switch 15 in parallel therewith, to which is applied the output $f$ from the logarithmic expansion circuit 14 serving as one input to a differential switching circuit 18, shown as a differential amplifier. The other input to the differential switching circuit 18 is received from a switching level determining means 17 shown as a variable voltage source. The output from the differential amplifier 18 controls an electromagnet 19 to bring about closing of the shutter.

With the arrangement described in the drawing, when the camera is directed to an object to be photographed, the light information circuit and the diaphragm value information circuit provide information about the brightness of the object to be photographed and the diaphragm value. This information is transmitted by amplifier 7 through switch means 8, 9 to capacitor 10. When the switch 8 or 9 is opened, the memory capacitor 10 stores that information. In the course of the normal automatic operation of the camera, the switch 9 will be automatically opened during the sequence of operations of photographing an object. Thus, the switch means 8,9 includes an automatic switch means 9 which causes the switch means 8,9 to assume automatically an open position in response to the sequence of operations which are automatically carried out by the camera, once the shutter plunger is fully depressed, so that the automatic switch means 9 is not controlled by the operator. When the switch 9 is opened, the capacitor 10 stores the value and, in combination with the film sensitivity value set on the variable resistor 11, determines the exposure time, so that when the switch 15 is subsequently opened, the exposure time will commence and will terminate in accordance with the switching level determined by the element 17. Instead of having the switch 9 automatically opened during the course of the sequence of operations of the camera, it is possible instead to manually open the switch 8, after partially depressing the shutter plunger to close the switch 2 in a known way, whereupon the information concerning the brightness of the object to be photographed and the information about the diaphragm value is stored in memory capacitor 10 at the moment the switch 8 is opened. It is apparent, therefore, that the switch means 8,9 includes a manually operable switch means 8 capable of being opened manually by the operator for placing the switch means 8,9 in an open position at the option of the operator after the manually operable switch means 2 is closed in order to energize the automatic exposure control circuit shown in the drawing. Thus, the photographer can first direct his camera to a particular area of the field to be photographed, or another equivalent field, and after partially depressing the shutter plunger operate the manual memory switch 8 whereupon the exposure factors concerning brightness and diaphram value will be memorized by the memory capacitor 10 at that moment. Assuming that the film sensitivity variable resistor 11 will not be subsequently changed, the final exposure time will be determined by the information stored on the memory capacitor 10.

The photographer can then change the diaphragm value, as for example by turning a diaphragm ring on the camera. Changing the diaphragm value will be done without changing the previously determined exposure time. Thus, the photographer can correct the exposure of the object actually being photographed by operating the diaphragm ring in accordance with the actual conditions of the field to be photographed, without changing the exposure time which has been previously determined.

It is noted that in accordance with this invention, information about the field brightness and the diaphragm value are memorized before the actual photographing of the object. The information concerning brightness, however, is determined automatically without resorting to any manual setting.

When photographing objects such as the sea or snow covered mountains, and the like, difficulty is generally encountered in obtaining a satisfactory exposure correction merely by a conventional memory operation. However, in the present invention, additional exposure correction can be obtained by utilizing the film sensitivity variable resistor 11. Since the information memorized in the memory capacitor does not include any information on the film sensitivity, this information can be freely varied as a means of exposure correction, enabling even objects such as seas or snow capped mountains to be photographed properly. Thus, after the camera is directed to a portion of the field which will determine the exposure time, the manual switch 8 is operated to cause this information to be stored on the memory capacitor 10. Then, the diaphragm value can be changed utilizing the variable resistor 5, and/or the film sensitivity can be changed utilizing the variable resistor 11. Both of these variable resistors provide a way of correcting the exposure in accordance with the actual object to be photographed. Varying the variable resistor 5 to change the diaphragm value will not change the exposure time. Changing the film sensitivity 11 will change the exposure time. However, this is in fact needed to provide proper exposure correction when shooting such objects as water and snow covered mountains and the like.

Therefore, under certain conditions, such as photographing objects spot-lighted on a stage, or as when photographing seas or mountains, with the device of the present invention, since the information about the diaphragm value can be memorized in advance of the actual photographing, exposure correction can be achieved easily, by varying only the quantity of the incident photographing light. This is accomplished by varying the diaphragm value after the manual memory switch has been operated. This correction is therefore accomplished without changing the information memorized from the memory capacitor 10 and therefore without changing the exposure time.

In addition, since information about film sensitivity is not memorized in the memory capacitor 10, it is possible to provide additional exposure correction by varying the information on the film sensitivity, for example by varying the variable resistor 11.

Thus, it is apparent from the above description that the circuitry of the invention is capable of automatically determining the exposure time according to the factors of brightness, diaphragm aperture, and film speed, while the switch 8 because it is capable of disconnecting the diaphragm and variable resistor 5 from the capacitor 10 after the latter stores the information in connection with brightness and diaphragm aperture forms a means which enables the light which reaches the film to be altered, by changing the setting of the diaphragm, without influencing the exposure time which is automatically determined. Furthermore, the film speed setting means which includes the variable resistor 11, because it does not influence the value stored by the capacitor 10, forms a means for changing the automatically determined exposure time without changing the amount of light which is received by the film.

It is therefore seen that the present invention provides simple circuit elements which permits manual and automatic operation and it is therefore simple in construction and cheap in assembly cost.

What is claimed is:

1. In a camera having an automatic exposure control circuit and a manually operable means for energizing said circuit, light receiving means positioned internally of the camera for receiving light passing through an objective of the camera and for converting it into a corresponding first electrical quantity, diaphragm information means for producing a second electrical quantity corresponding to the setting of the diaphragm, operational amplifier means connected electrically with said light receiving and diaphragm information means for combining said first and second electrical quantities and for providing therefrom a combined electrical output signal for use in contributing partly to determination of exposure time, capacitor means for storing said combined electrical output signal, and normally closed manual and automatic switch means for assuming an open position, after energizing of said automatic exposure control circuit by said manually operable means, either in response to manual opening of said normally closed switch means or in response to automatic opening of said normally closed switch means during a sequence of camera operations in connection with making an exposure, said normally closed switch means being interconnected between said operational amplifier means and said capacitor means for causing said combined electrical output signal to be stored in said capacitor means and to be retained thereby upon opening of said normally closed switch means either manually or automatically, so that after manual opening of said normally closed switch means a diaphragm of the camera can have its setting changed to change the actual exposure made by the camera without changing the automatically determined exposure time.

2. The combination of claim 1 and wherein said normally closed switch means comprises an automatic switch means for assuming automatically an open position during a sequence of camera operations in connection with making an exposure and a manually operable switch means capable of being manually opened by the operator and serially interconnected with said automatic switch means.

3. The combination of claim 1 and wherein said light receiving means and said diaphragm information means each has in series therewith a substantially identical logarithmic compression means.

4. The combination of claim 1 and wherein said diaphragm information means includes a variable resistor, and wherein the variable ratio of said variable resistor is substantially equal to the variable ratio of the light receiving means.

5. The combination of claim 1 and wherein said operational amplifier means is a first operational amplifier means and further comprising film sensitivity information means for producing a third electrical quantity corresponding to the film sensitivity, and second operational amplifier means electrically connected with said capacitor means and said film sensitivity information means for combining said stored signal with said third electrical quantity for determining the exposure time from all three electrical quantities, so that by changing said third electrical quantity to a value which does not correspond to the film sensitivity it is possible to change the automatically determined exposure time for introducing a correction, if required.

6. The combination of claim 5 and wherein said light receiving means, said diaphragm information means, and said film sensitivity information means respectively have in series therewith substantially identical logarithmic compression means.

7. The combination of claim 5 and wherein said diaphragm information means and said film sensitivity information means each include a variable resistor, and wherein the variable ratios of said variable resistors and the variable ratio of said light receiving means are substantially equal.

8. The combination of claim 5 and further comprising voltage supply means, differential switching means, timing capacitor means connected to said second operational amplifier means and to said differential switching means for receiving an output signal from said second operationsl amplifier means and charging up to the value of said voltage supply means, timing switch means connected in parallel to said timing capacitor for causing said timing capacitor to charge up to the value of said voltage supply means, switching level determining means connected to said differential switching means for determining the value at which said differential switching means produces an output, and electromagnetic means responsive to the output of said differential switching means for controlling the closing of the shutter.

\* \* \* \* \*